(12) United States Patent
De Simone et al.

(10) Patent No.: US 12,466,273 B2
(45) Date of Patent: Nov. 11, 2025

(54) CONTROL METHOD FOR AN ELECTRICALLY DRIVEN ROAD VEHICLE DRIVEN BY A DRIVER, AND RELATIVE ROAD VEHICLE

(71) Applicant: FERRARI S.P.A., Modena (IT)

(72) Inventors: Raffaele De Simone, Modena (IT); Alessandro Flumeri, Modena (IT); Stefano Varisco, Modena (IT)

(73) Assignee: FERRARI S.P.A., Modena (IT)

( * ) Notice: Subject to any disclaimer, the term of this patent is extended or adjusted under 35 U.S.C. 154(b) by 290 days.

(21) Appl. No.: 18/295,581

(22) Filed: Apr. 4, 2023

(65) Prior Publication Data

US 2023/0322096 A1 Oct. 12, 2023

(30) Foreign Application Priority Data

Apr. 8, 2022 (IT) .................. 102022000007013

(51) Int. Cl.
*B60L 15/20* (2006.01)

(52) U.S. Cl.
CPC ..... *B60L 15/2054* (2013.01); *B60L 2240/423* (2013.01); *B60L 2240/486* (2013.01); *B60L 2240/64* (2013.01)

(58) Field of Classification Search
None
See application file for complete search history.

(56) References Cited

U.S. PATENT DOCUMENTS

| | | | | |
|---|---|---|---|---|
| 2012/0326856 A1* | 12/2012 | Levin | ............. | B60W 50/14 |
| | | | | 701/1 |
| 2020/0216087 A1 | 7/2020 | Kim et al. | | |
| 2021/0122371 A1* | 4/2021 | Choi | ............. | B60W 10/188 |
| 2021/0387530 A1* | 12/2021 | Oh | ............. | F16H 61/0213 |
| 2022/0041067 A1* | 2/2022 | Isami | ............. | B60L 15/20 |
| 2023/0001928 A1* | 1/2023 | Park | ............. | B60W 10/188 |

FOREIGN PATENT DOCUMENTS

| | | |
|---|---|---|
| DE | 102014225441 A1 | 6/2015 |
| DE | 102017215595 A1 | 3/2019 |
| EP | 2537727 A1 | 12/2012 |
| JP | 2021151168 A | 9/2021 |

OTHER PUBLICATIONS

Italian Search Report for Application No. 102022000007013; Filing Date: Apr. 8, 2022; Date of Mailing—Nov. 18, 2022, 9 pages.
European Search Report for European Patent Application No. 23167190.0, Date of Mailing: May 31, 3023, 9 pages.

* cited by examiner

*Primary Examiner* — Navid Z. Mehdizadeh
*Assistant Examiner* — Jason R Roberson
(74) *Attorney, Agent, or Firm* — CANTOR COLBURN LLP

(57) ABSTRACT

A control method for an electrically driven road vehicle comprising the steps of: providing an electric powertrain system; determining a plurality of first virtual gears for a boost configuration and/or a plurality of second virtual gears for a release configuration; detecting, following actuation of an interface system by the driver, while driving, a first selection for one of the first virtual gears and/or a second selection for one of the second virtual gears; and delivering, in the boost configuration, a drive torque to the at least two wheels as a function of the first selection; or delivering, in the release configuration, an anti-motive torque to the at least two wheels according to the second selection.

16 Claims, 4 Drawing Sheets

CONTROL METHOD FOR AN ELECTRICALLY DRIVEN ROAD VEHICLE DRIVEN BY A DRIVER, AND RELATIVE ROAD VEHICLE

CROSS-REFERENCE TO RELATED APPLICATIONS

This application claims the priority form Italian patent application no. 102022000007013, filed on Apr. 8, 2022, the entire disclosure of which is incorporated herein by reference.

TECHNICAL FIELD

The present invention relates to a control method for an electrically driven road vehicle driven by a driver and to a relative road vehicle.

In particular, the present invention can be applied advantageously, but not exclusively, in the control of a high-performance vehicle configured to perform laps on a track, to which the following description will make explicit reference without any consequent loss in generality.

BACKGROUND OF THE INVENTION

Historically, in the course of the technological evolution of the motor vehicle, it became necessary to introduce a gear-shifting (or speed-changing) system to overcome mechanical limits imposed by the endothermic engine, which, in the absence of the gear-shifting system, would not be able to cover an adequate range of speeds.

In particular, as a result, a gear-shifting device that allows the transmission ratio to be varied is used in order to allow the multiplication of the torque provided by the engine and in order to adapt the rotational speed of the latter to that of the wheels (so that high power outputs are potentially available even at rather low forward velocities so that it is possible to reach high speeds).

This device in the overwhelming majority of cars is still the mechanically controlled gearbox, which allows the driver to choose between different ratios, i.e. between different gears (the number of gears varies based on the vehicle model), depending on the conditions of use of the vehicle.

Over the decades, based on this need for a gear-shifting system dictated by the limitations of the endothermic engine, the opportunity to produce numerous types of gearbox systems arose, in particular gearbox systems with an increasingly improved performance (for example the known dual-clutch transmission). The gear-shifting system has thus become a distinguishing feature among vehicle manufacturers and, as mentioned above, a means of engaging the driver of the road vehicle.

In recent times, with the spread of electric powertrain systems, there is a movement away from the endothermic engine and accordingly towards the introduction of at least one electric motor, which overcomes the gear-shifting need as it is perfectly capable of rapidly providing the necessary torque and going from zero speed to a maximum speed without any problems of transmission.

Although electric powertrain systems tend to allow performance to be improved, inasmuch as they always exploit the maximum acceleration available for a given speed, the involvement of the driver in making certain choices, e.g. which gear to use to negotiate a curve, tends to be reduced, which thus simultaneously reduces driving pleasure, especially in the case of high-performance sports vehicles.

The patent document US2021122371 describes a control system for an all-wheel-drive vehicle with a hybrid powertrain system for the front wheels and an electric powertrain system for the rear wheels.

The patent document US2020216087 describes a control system for a hybrid or electrically driven vehicle in which the driver can select from a remote interface outside the vehicle, for example a mobile phone, certain vehicle settings.

The patent document DE102017215595 describes a method for calculating an optimal trajectory.

The patent document EP2537727 describes a method for estimating the speed profile of a vehicle.

The patent document DE102014225441 describes a vehicle having a continuous transmission that simulates a gear transmission.

The object of the present invention is to provide a control method for an electrically driven road vehicle driven by a driver, and a relative road vehicle, which are at least partially exempt from the drawbacks described above and, at the same time, are simple and inexpensive to produce.

SUMMARY

According to the present invention, a control method for an electrically driven road vehicle driven by a driver and a relative road vehicle are provided in accordance with the following independent claims and, preferably, any of the claims depending directly or indirectly on the independent claims.

The claims describe preferred embodiments of the present invention and constitute an integral part of the present description.

BRIEF DESCRIPTION OF THE DRAWINGS

The present invention will now be described with reference to the accompanying figures, which illustrate non-limiting embodiments thereof, wherein.

DETAILED DESCRIPTION

With reference to the accompanying figures, reference number 1 indicates, as a whole, a road vehicle according to non-limiting embodiments of the present invention.

The same reference numbers and the same reference letters in the figures identify the same elements or components with the same function.

In the scope of the present description, the term "second" component does not imply the presence of a "first" component. These terms are in fact used as labels to improve clarity and are not to be understood in a limiting manner.

The elements and features illustrated in the different preferred embodiments, including the drawings, can be combined with one another without departing from the scope of protection of the present application as described in the following.

In particular, the road vehicle 1 is provided with two front wheels 2 and two rear wheels 2, at least two of which are drive wheels.

Figure 2:
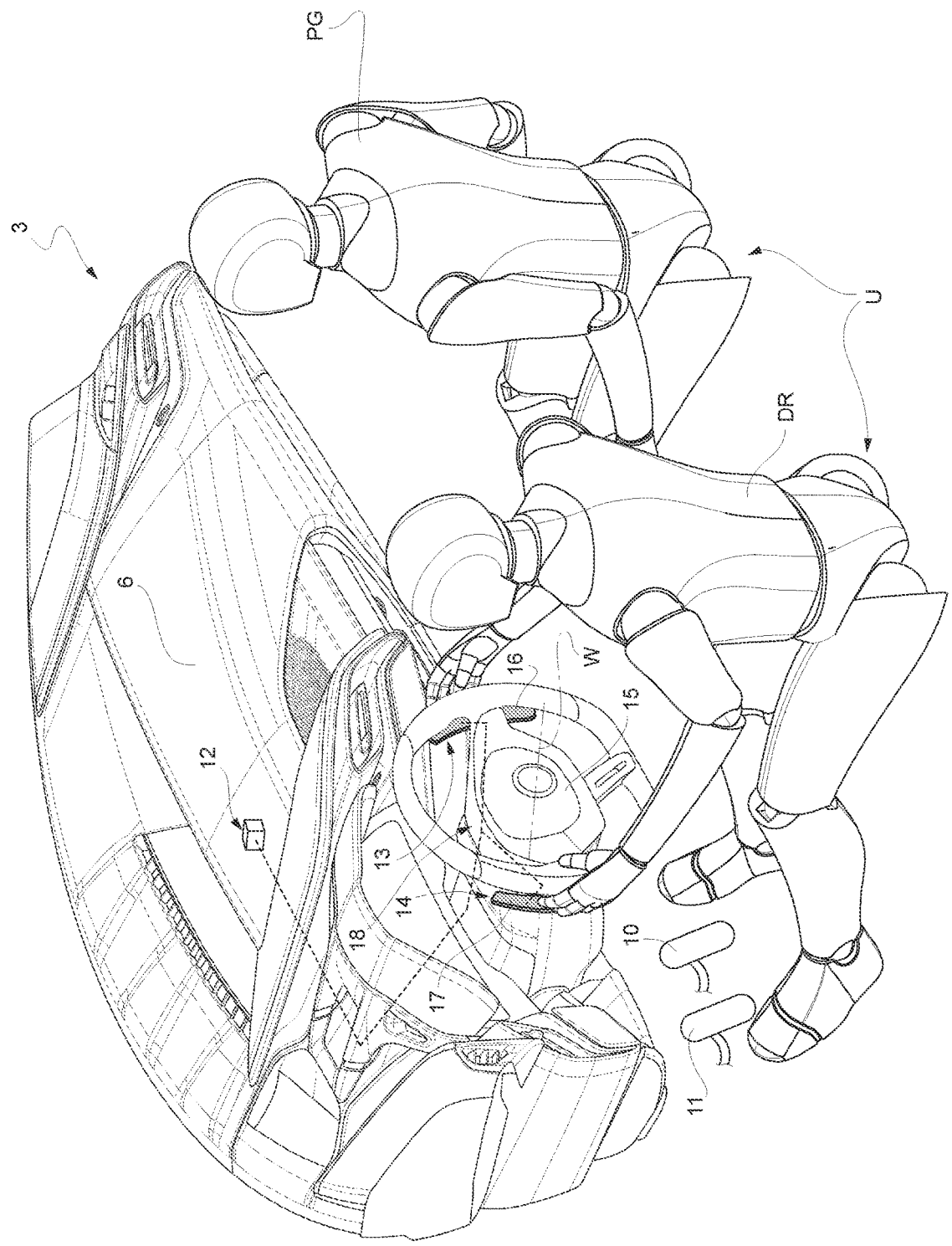
FIG. 2 is a perspective view, with details removed for clarity, of part of the interior of the road vehicle of FIG. 1.

The vehicle 1 is provided with a passenger compartment 3 that is designed to accommodate one or more users U, such as the driver DR and one or more passengers PG as illustrated in FIG. 2.

Figure 1:
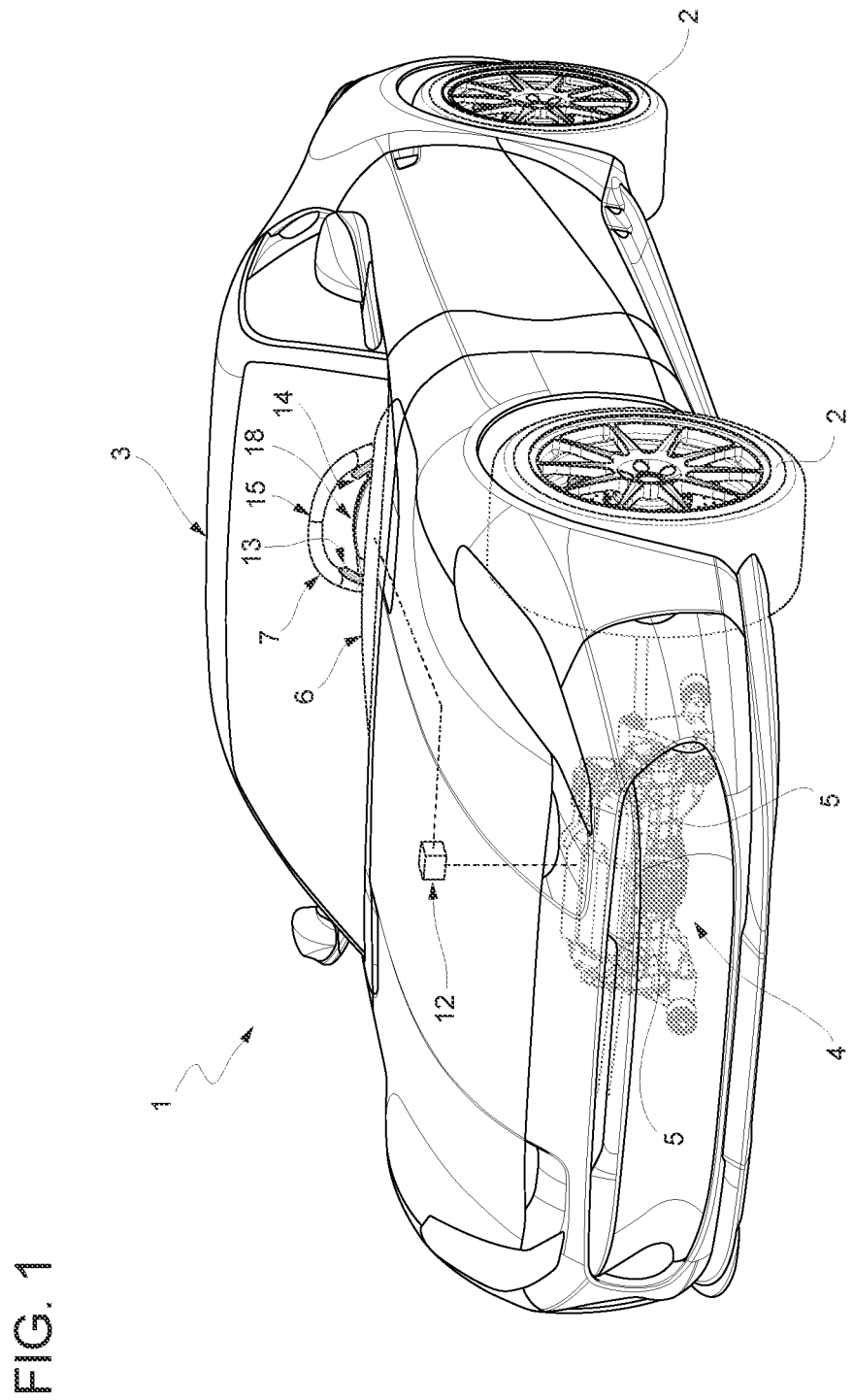
FIG. 1 is a perspective and schematic view of a road vehicle according to the present invention provided with an electric powertrain system.

In the non-limiting embodiment of FIG. 1, the vehicle 1 comprises an electric powertrain system 4 configured to deliver drive torque to the at least two drive wheels 2, in particular arranged at the front axle of the road vehicle 1 (i.e. the vehicle is front-wheel drive).

In other non-limiting embodiments not illustrated, the powertrain system 4 is arranged at a rear axle (i.e. the vehicle is rear-wheel drive).

In further non-limiting embodiments not illustrated, the powertrain system 4 is arranged at both of the aforementioned axles (i.e. the vehicle is all-wheel drive).

In particular, each single-axle drive can be defined by a single electric motor 5, potentially coupled to a differential, or by a pair 5 of electric motors.

In particular, in the case of an all-wheel drive, this drive can comprise two electric motors 5 (one front and one rear), three electric motors 5 or an electric motor 5 for each wheel 2 of the road vehicle 1.

The vehicle 1 also includes a vehicle dashboard 6, which is arranged in front of the driver DR and a potential passenger PG, is of a known type and is thus not described in greater detail in the following.

Advantageously, the vehicle 1 further comprises an interface system 7 which is configured to allow the driver DR to select a plurality of first virtual gears 8 for a boost configuration PC, i.e. an acceleration configuration, and/or a plurality of second virtual gears 9 for a release configuration RC, i.e. a deceleration configuration.

Specifically, the term "first virtual gears" is understood to mean the setting of a higher limit for the positive longitudinal acceleration Ax (and consequently for the drive power delivered to the wheels) of the road vehicle 1, while the term "second virtual gears" is understood to mean the setting of a lower limit for the negative longitudinal acceleration −Ax (and consequently for the braking power delivered to the wheels) of the road vehicle 1 without acting on a brake pedal 11.

Preferably, the boost configuration PC corresponds to a vehicle condition in which the only pedal operated by the driver DR is an accelerator pedal 10, in particular pressed to the floorboard.

Preferably, the release configuration RC corresponds to a vehicle condition in which no pedal (between at least the accelerator 10 and the brake 11) is operated by the driver DR so that the deceleration of the vehicle is primarily determined by the resistant/braking (anti-motive) force generated by the electric motor 5 (as well as the air friction and the interaction of the vehicle with the road surface).

Figure 3:
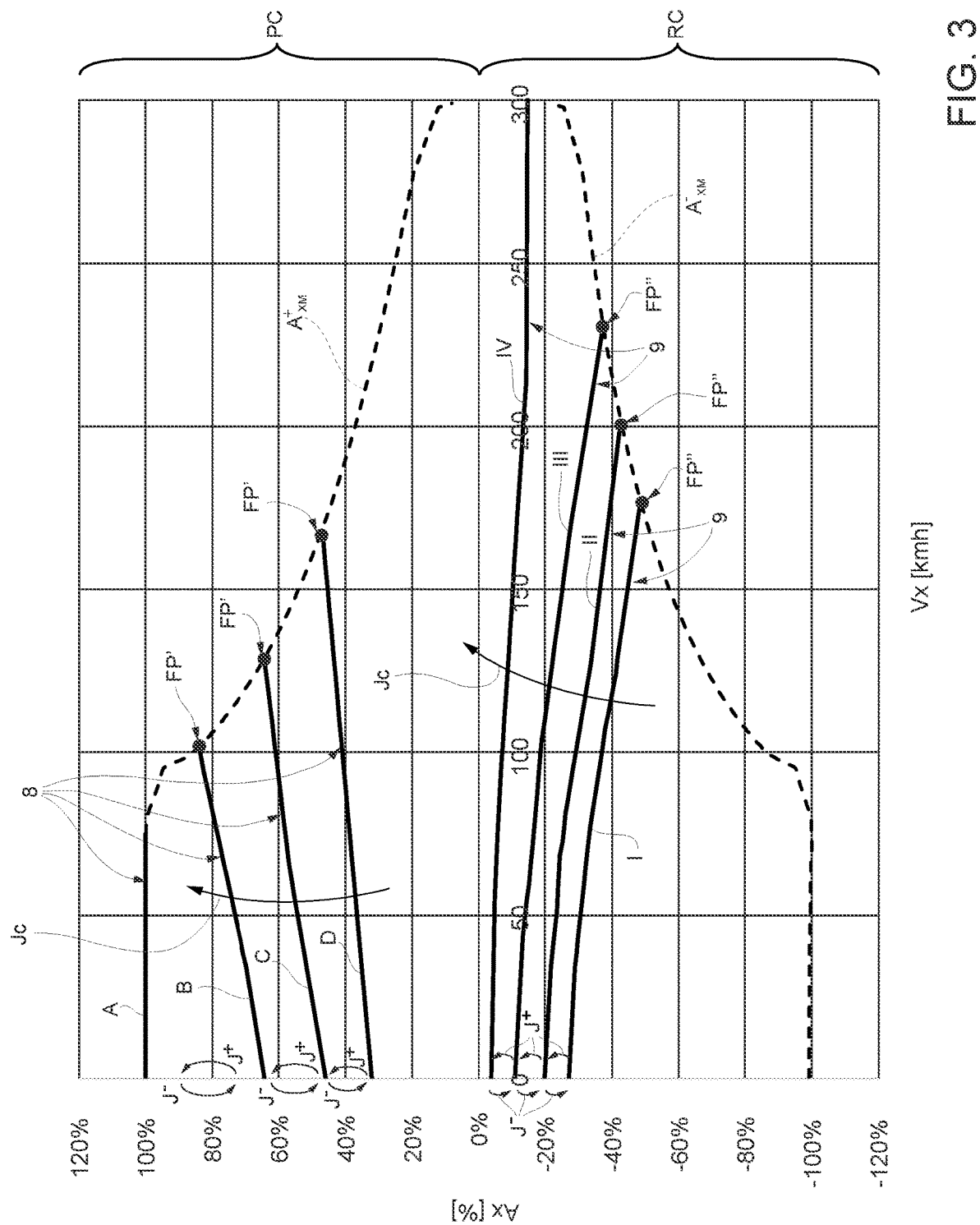
FIG. 3 is a graph illustrating the variation of acceleration as the longitudinal velocity of the vehicle of FIG. 1 varies, both in an acceleration configuration and in a release configuration.

As illustrated in the non-limiting embodiment of FIG. 3, the first virtual gears 8 each determine a longitudinal first, acceleration Ax limit profile A, B, C, D (i.e. profiles of deliverable power) as the longitudinal velocity Vx varies in the boost configuration PC. In particular, by exploiting the characteristics of the electric powertrain system 4, it is possible to define infinite intermediate profiles between the aforementioned limit profiles and the maximum acceleration (i.e. power) that can be delivered.

As illustrated in the non-limiting embodiment of FIG. 3, the second virtual gears 9 each determine a second, deceleration (i.e. a negative acceleration Ax) limit profile I, II, III, IV as the velocity Vx varies in the release configuration RC. In particular, by exploiting the characteristics of the electric powertrain system 4, it is also possible to define infinite intermediate profiles between the aforementioned limit profiles and the maximum deceleration that can be delivered.

In particular, the acceleration limit profiles A, B, C D and the deceleration limit profiles I, II, III, IV are determined empirically, for example in a similar manner to the selection of a gear calibration for vehicles that have a gearbox of a known type and an internal combustion engine.

More specifically, the acceleration limit profiles A, B, C, D and deceleration limit profiles I, II, III, IV each allow all longitudinal velocities Vx to be covered (from zero to the maximum speed), without requiring the use of a rpm limiting device, as in known systems that include a gearbox and endothermic motorisation.

Advantageously, the vehicle 1 comprises an electronic control unit 12 ("ECU"—illustrated schematically in FIGS. 1 and 2), which is configured to detect, following actuation of the interface system 7 by the driver DR, while driving, a first selection S' for one of the first virtual gears 8 and/or a second selection S" for one of the second virtual gears 9.

In addition, the control unit 12 is configured to control the delivery of the drive torque to the at least two drive wheels 2 according to the first selection S' and/or the second selection S".

Consequently, by means of the interface system 7, the driver DR can change the selections S' and S" as desired, by choosing, among the first virtual gears 8 and the second virtual gears 9, those that he or she prefers in order to negotiate the next section of road, for example the next curve.

Advantageously but not necessarily, the control unit 12, among other things, processes a plurality of data and regulates the behaviour of the road vehicle 1 both when driving along a straight section of road and when negotiating a curve by intervening, for example, both on the torque delivered by the electric motors 5 to the drive wheels 2 and in the management of any active shock absorbers of the suspensions.

Physically, the control unit 12 can consist of a single device or of a plurality of separate devices that communicate with one another through the local network (for example CAN, Ethernet, etc.) of the road vehicle 1.

Advantageously but not necessarily, as illustrated in the non-limiting embodiment of FIG. 2, the interface system 7 comprises at least one first actuation device 13 operable by the right hand of the driver and at least one second actuation device 14 operable by the left hand of the driver DR.

According to some non-limiting embodiments, one between the first actuation device 13 and the second actuation device 14 is configured to allow the driver DR to select one of the first virtual gears 8 and the other between the first actuation device 13 and the second actuation device 14 is configured to allow the driver DR to select one of the second virtual gears 9.

According to other non-limiting embodiments, one between the first actuation device 13 and the second actuation device 14 is configured to allow the driver DR to increase (manually) the acceleration Ax limit (i.e. to choose an acceleration limit profile A, B, C D or a deceleration limit profile I, II, III, IV that is higher than the current limit profile in a graph such as the one shown in FIG. 3) and the other between the first actuation device 13 and the second actuation device 14 is configured to allow the driver DR to downshift/reduce the acceleration Ax limit (i.e. to choose an acceleration limit profile A, B, C D or a deceleration limit profile I, II, III, IV that is lower than the current limit profile in a graph such as the one shown in FIG. 3).

Advantageously but not necessarily, the vehicle 1 comprises a steering wheel 15, which is rotatable about a central steering axis W.

Preferably but not limitatively, the first actuation device 13 and the second actuation device 14 are respectively arranged to the right and to the left of the central steering axis W, in particular symmetrically, in particular so as to face each other and extend radially from said central steering axis W.

In some non-limiting cases, the actuation device 13 is a right paddle (or right lever) 16 and the actuation device 14 is a left paddle (or left lever) 17 of a gear shift control assembly 18 of a known type and not described in further detail in the following.

In other non-limiting cases not illustrated, the actuation device 13 and the actuation device 14 are buttons, levers or manettino dials.

In further non-limiting cases not illustrated, the actuation device 13 and the actuation device 14 are different from each other and chosen from among the devices indicated in the foregoing.

According to some preferred non-limiting embodiments, the actuation device 13 (for example the right paddle 16) is configured to allow the driver DR, for example in the boost configuration, to increase the acceleration Ax limit by a discrete jump $J^+$ (illustrated in the non-limiting embodiment of FIG. 3) or a continuous shift Jc from one first virtual gear 8 to another higher up in a graph such as the one shown in FIG. 3 (i.e., one that allows delivering a higher drive torque). This way, as opposed to vehicles with an internal combustion engine and a conventional gearbox (which, in the boost phase, require a shift towards gears that reduce the available acceleration in the interest of speed—moving, as it were, from the limit profile A towards the limit profile D), as there is no limit to the speed each gear can reach, the driver DR can choose, in the boost phase, to increase performance by operating the actuation device 13 and thereby increasing the power provided by the motor (raising the acceleration limit profile as a function of the velocity), thus essentially changing the selection S' from the profile D towards the profile A. As used herein, "discrete" means in distinct steps corresponding to selection of different virtual gears; and "continuous" means in a manner allowing selection of any intermediate value between two virtual gears by prolonged actuation of the interface system.

This applies analogously to the limit profiles I, II, III, IV (as illustrated in the non-limiting embodiment of FIG. 3).

Analogously, not limitatively, the actuation device 14 (for example the left paddle 17) is configured to allow the driver DR, for example in the release configuration, to decrease the acceleration Ax limit (i.e., to increase the deceleration) by a discrete jump $J^-$ (illustrated in the non-limiting embodiment of FIG. 3) or a continuous shift from a second virtual gear 9 to another lower down in a graph such as the one shown in FIG. 3 (i.e., one that allows delivering a higher resistant or anti-motive torque). This way, similarly to vehicles with an internal combustion engine and a conventional gearbox (which, in the release phase, require a shift towards gears that increase the resistance of the engine at the expense of speed—moving, as it were, from the limit profile IV towards the limit profile I), the driver DR can choose, in the release phase, to increase the resistant torque of the electric motor 5 by operating the actuation device 14 and thereby increasing the resistance delivered by the motor (lowering the acceleration limit profile as a function of the velocity), thus essentially changing the selection S" from the profile IV towards the profile I.

Advantageously but not necessarily, the road vehicle 1 is a high-performance sports vehicle, i.e. configured to perform laps on a track 20.

According to some non-limiting embodiments, the first actuation device 13 and the second actuation device 14 each comprise two sub-devices 13', 14', which are configured to allow the driver DR to upshift or downshift the first virtual gears 8 and the second virtual gears 9, respectively. For example, in order to upshift or downshift the first virtual gears 8, there can be two different buttons + and –, or a bi-directional lever, or a pair of levers on either side of the steering wheel 15, i.e. each lever 16 and 17 can comprise two sub-levers.

According to a further aspect of the present invention, a control method is provided for an electrically driven road vehicle driven by a driver DR.

The method comprises the steps of providing the electric powertrain system 4 configured to deliver drive torque to at least two wheels 2 of the road vehicle 1.

The method further comprises the step of determining the plurality of first virtual gears 8 for a boost, i.e. acceleration configuration PC, and/or the plurality of second virtual gears 9 for a release, i.e. deceleration configuration RC.

As mentioned in the foregoing and as illustrated in the non-limiting embodiment of FIG. 3, the first virtual gears 8 each determine a longitudinal first, acceleration Ax limit profile A, B, C, D as the longitudinal velocity Vx varies in the boost configuration PC; in addition, preferably, the second virtual gears 9 each determine a second, deceleration (i.e. a negative acceleration Ax) limit profile I, II, III, IV as the velocity Vx varies in the release configuration RC.

Furthermore, the method comprises the step of detecting, following the actuation of the interface system 7 by the driver DR, while driving, the first selection S' for one of the first virtual gears 8 and/or the second selection S" for one of the second virtual gears 9.

Finally, the method provides that, in the boost configuration PC, a drive torque is delivered to the at least two drive wheels 2 according to the first selection S'.

Alternatively, the method provides that, in the release configuration RC, a resistant or anti-motive torque is delivered to the at least two drive wheels 2 as a function of the second selection S".

In some non-limiting cases, a second gear 9 corresponds to a first virtual gear 8. For example, not limitatively, in the embodiment of FIG. 3, the first gear B corresponds to the second gear IV, the first gear C corresponds to the second gear III, and so on.

In other words, in these cases, as illustrated in the non-limiting embodiment of FIG. 3, when a discrete jump $J^+$ is carried out from the gear C to the gear B, a same jump $J^+$ is carried out from the gear II to the gear III, i.e. the acceleration $A_X$ of the first limit profile is increased and the deceleration $-A_X$ of the second limit profile is decreased (the vehicle 1 will accelerate more suddenly, and likewise decelerate less suddenly, as though downshifting from the third to the second gear in a conventional gearbox of an internal combustion powertrain system).

Analogously, when a discrete jump $J^-$ is carried out from the gear B to the gear C, a same jump $J^-$ is carried out from the gear III to the gear II, i.e. the acceleration $A_X$ of the first limit profile is reduced and the deceleration $-A_X$ of the second limit profile is increased (the vehicle 1 will accelerate less suddenly, and likewise decelerate more suddenly, as though upshifting from the second to the third gear in a conventional gearbox of an internal combustion powertrain system).

Advantageously but not necessarily, whenever the driver DR actuates the interface device 7 in order to bring about a discrete jump J⁻ (for example by actuating the left paddle 17), the control unit 12 delivers a peak in torque to the wheels 2 in order to reproduce the effect of a mechanical shift.

In other preferred, non-limiting cases, the first selection (S') and the second selection (S") are mutually independent.

In other words, the driver DR chooses freely for each configuration PC, RC which virtual gear 8, 9 to use, without the latter being connected or subject to mutual constraints. This allows an even greater degree of freedom compared to a conventional gearbox (which allows the engagement of one gear at a time, whether under acceleration or deceleration). In contrast, the first gears 8 and the second gears 9 are not interrelated in the present case (i.e. they are independent and not subject to mutual constraints) and, since the electric motors 5 are able to cover the entire range of velocities in the same virtual gear 8, 9, it is possible to further customise the driving experience for the driver DR, thus increasing his or her associated pleasure and engagement.

Figure 4:
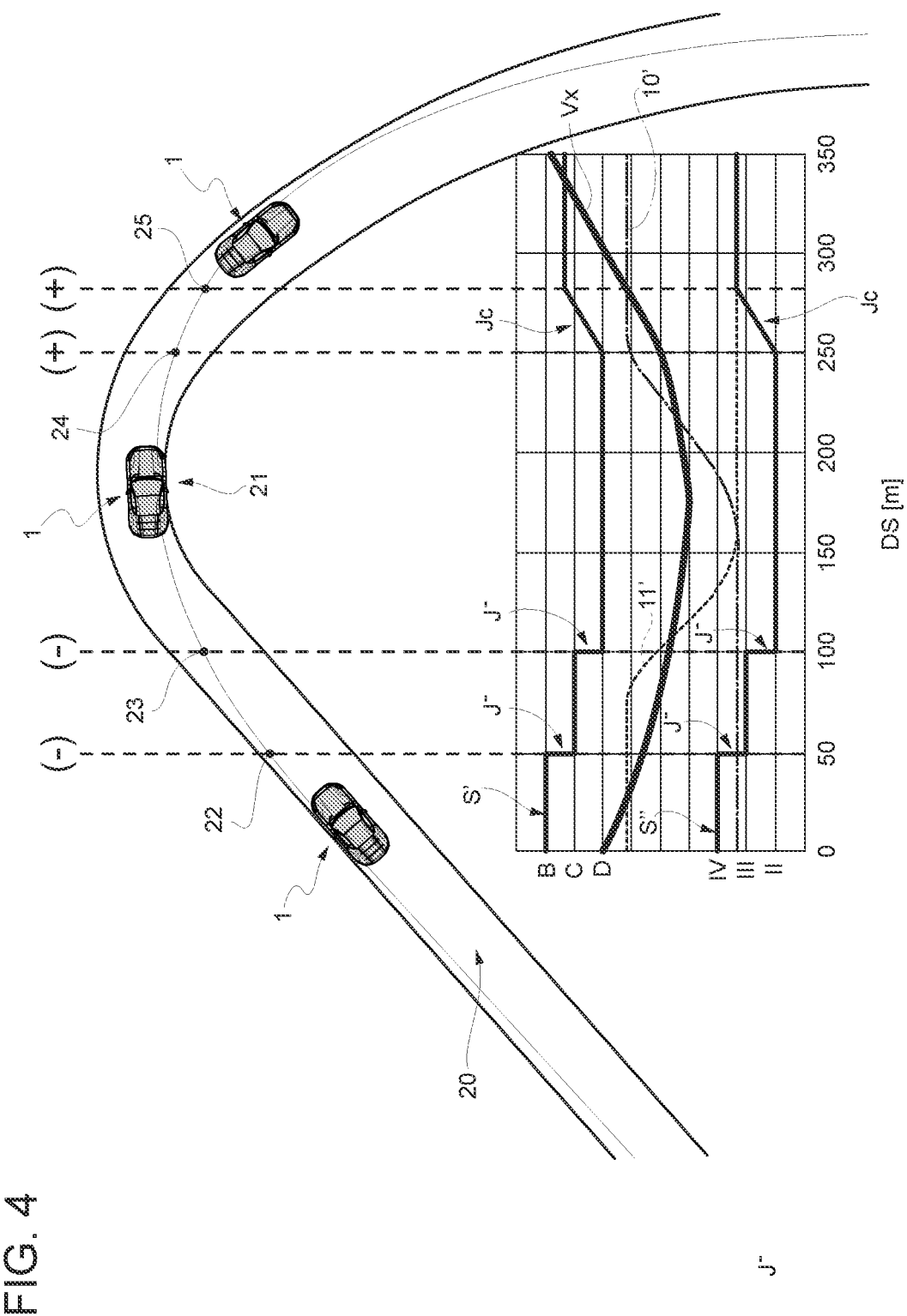
FIG. 4 is a schematic example of how a driver might use the vehicle of FIG. 1 when negotiating a curve, which is illustrated in a plan view.

According to some preferred non-limiting embodiments, the step of detecting the first selection S' occurs, in use, when the vehicle is exiting a curve 21 (see, for example, FIG. 4).

Alternatively or additionally, preferably but not limitatively, the step of detecting the second selection S" occurs, in use, when the vehicle is approaching a curve 21 (see, for example, FIG. 4).

Advantageously but not necessarily, the interface system 7 sequentially detects different variations of the first selection S' and the second selection S". This makes it possible to simulate a gearbox of a sequential type, which, through a series of discrete jumps J⁺, J⁻, allows the first gear 8 and the second gear 9 to be respectively shifted sequentially.

Advantageously but not necessarily, as soon as a variation of the first selection S' or the second selection S" is detected, the drive or anti-motive torque delivered by the powertrain system 4 to the drive wheels 2 varies immediately as a function of the variation of the selection S', S".

According to the preferred yet non-limiting embodiment of FIG. 3, each first limit profile A, B, C, D determines an increasing trend of the acceleration $A_X$ limit as the velocity $V_X$ increases in the boost configuration PC, until reaching the maximum acceleration $A_{XM}^+$ for the powertrain system 4.

Coherently, in the preferred yet non-limiting embodiment of FIG. 3, each second limit profile I, II, III, IV determines an increasing trend of the deceleration limit (i.e. a decreasing trend of the acceleration $A_X$) as the velocity $V_X$ increases in the release configuration RC, until reaching the maximum deceleration $A_{XM}^-$ for the powertrain system 4.

In other words, in the case of the boost configuration PC (and vice versa for the release configuration RC), for a given range of velocities $V_X$, the acceleration $A_X$ increases (decreases) until it reaches the maximum acceleration profile $A_{XM}^+$ ($A_{XM}^-$) for the powertrain system 4. Once the maximum acceleration profile $A_{XM}^+$ ($A_{XM}^-$) has been reached at a respective inflection point FP' (FP"), each first (second) profile A, B, C, D (I, II, III, IV) follows the maximum acceleration profile $A_{XM}^+$ ($A_{XM}^-$) for the powertrain system 4 in the boost configuration PC (in the release configuration RC), which, evidently, cannot be exceeded for reasons relating to the design of the road vehicle 1 and decreases as the longitudinal velocity $V_X$ increases.

In particular, the maximum acceleration profile $A_{XM}^+$ ($A_{XM}^-$) for the powertrain system 4 is calculated as a function of the model of the road vehicle 1, i.e. as a function of the weight of the road vehicle 1 and the tractive power installed in the same (i.e. the power of the vehicle battery pack that powers the electric motors 5).

According to some non-limiting embodiments, the shift (or jump) J⁺, J from a first gear 8 to another or from a second gear 9 to another occurs discretely as a result of the actuation of the interface system 7 by the driver DR. For example, as occurs in a sequential gearbox of a known type, the driver DR pulls the right paddle 16 back towards him-/herself in order to increase the gear 8, which shifts non-continuously, i.e. discretely, to the next (e.g. higher) gear 8 in order to increase the acceleration $A_X$. Obviously, by way of example, the same thing happens when the left paddle 17 is operated for the variation of the virtual gear 9, thus increasing the deceleration $-A_X$.

Alternatively or additionally, the shifting from a first gear 8 to another and/or from a second gear 9 to another occurs continuously (for example in a continuous shift Jc, as illustrated in the non-limiting embodiment of FIG. 3 between the limit profiles B to A, or in FIG. 4 between the limit profile D and an intermediate value between the profiles B and C) as the result of a prolonged actuation, i.e. exceeding a minimum actuation time, of the interface system 7 by the driver DR. In particular, the first selection S' and/or the second selection S" will be equal to the first gear 8 and/or the second gear 9 reached at the time of the interruption of the actuation of the interface system 7.

Advantageously but not necessarily, the minimum actuation time is equal to or greater than 400 ms, in particular equal to or greater than 500 ms.

In other words, when the driver DR actuates the interface system 7 in a prolonged (non-impulsive) manner (for example keeps the right paddle 16 pulled back) for a time exceeding the minimum actuation time, the selection S' (as well as, potentially but not limitatively, S") shifts continuously on the graph shown in FIG. 3, i.e. the acceleration increases or decreases continuously (for example from the profile C towards the profile A) until the moment when the actuation of the interface system 7 is interrupted (for example until the driver DR releases the right paddle 16), wherein the first selection S" or the second selection S" is defined as the selection that corresponds to the instant at which the actuation was interrupted. This way, in addition to the first gears 8 and the second gears 9 determined previously, the driver DR can select any intermediate first or second gear 8, 9, thus exploiting the flexibility of the electric powertrain system 4, which allows potentially infinite intermediate gears to be defined, thus exploiting the entire area defined between the maximum acceleration $A_{XM}^+$ and the minimum acceleration $A_{XM}^-$. In short, the driver DR is provided with the option of moving between one virtual gear 8, 9 and another in a fluid/continuous manner.

Advantageously but not necessarily, and as illustrated in the non-limiting embodiment of FIG. 4, the negative jumps J⁻ between the first gears 8 or between the second gears 9 (always) occur in a discrete manner, while the positive shifts Jc between the first gears or the second gears occur in a continuous manner if the minimum actuation time indicated above is exceeded.

According to preferred yet non-limiting embodiments, for example in the case where the first actuation device 13 and the second actuation device 14 are monostable devices (i.e., with a single actuation position and one rest position, such as a pushbutton or a gear-shifting paddle of a known type), the method comprises resetting the first selection S' and/or the second selection S' upon the occurrence of a first event and/or a second event, respectively. The term "reset" is understood to mean "return to a default value". In the case where the first selection S' and/or the second selection S" are already equal to their respective default values, there would be no change, but if the first selection S' and/or the second selection S" differ from their respective default values, they would be "reset", i.e. returned to those values. Preferably, the default value for the first selection S' is different from the default value for the second selection S". This makes it possible to use a same control (for example a right paddle) for the upshifting of both the first selection S' and the second selection S" (the same applies, for example, for a left paddle in the case of a downshifting).

In particular, the first selection S' is reset (for example to the first limit profile D) when approaching a curve 21, in particular following a braking on the part of the driver DR. In other words, the first event is the start of a braking operation, i.e. the first selection S' is reset as soon as the driver presses the brake pedal 11. This allows the driver, when exiting the curve 21, to manually intervene by increasing the power delivered by changing the selection S', until the limit profile corresponding to the maximum acceleration profile $A_{XM}^+$ is potentially reached.

Alternatively or additionally, not limitatively, the second selection S" is reset (for example to the second limit profile IV, corresponding to the profile with the least deceleration) when exiting the curve 21, in particular following a (maximum) acceleration by the driver DR, i.e. when the accelerator pedal 10 reaches the limit switch or as soon as the accelerator pedal 10 is pressed by the driver DR when exiting the curve 21.

Consequently, preferably but not necessarily, the method further comprises a step of identifying a curve 21 of a track 20 and respective steps of entering and exiting said curve according to known strategies which are thus not described in further detail in the following.

Advantageously but not necessarily, in the case of partialising (i.e. in case of a partial depression of the accelerator pedal 10, in other words when the accelerator pedal 10 is neither fully released nor fully depressed) by the driver DR, the drive and/or anti-motive torque delivered is an interpolation (essentially linear) between the first limit profile A, B, C, D indicated by the selection S' and the second limit profile I, II, III, IV indicated by the selection S", as a function of the velocity $V_X$ of the road vehicle.

In the non-limiting embodiment of FIG. 3, the upper and lower portions of the graph illustrate the boost configuration PC and the release configuration RC, respectively, as described in the foregoing.

The non-limiting embodiment of FIG. 4 illustrates a non-limiting example in which a driver DR on board a vehicle 1 is negotiating a curve 21 of a track 20. In particular, the graph underneath the track 20 illustrates the variation, as a function of the distance DS in metres, of the selections S' and S", of the longitudinal velocity Vx, of the pressure profile 10' of the accelerator pedal 10 and of the pressure profile 11' of the brake pedal 11, based on the choices of the driver DR. More specifically, when approaching the curve 21, the driver DR arrives with the selection S' set to the limit profile B and the selection S" set to the limit profile IV. Specifically, once the point 22 is reached, the driver DR actuates the second actuation device 14 and carries out a first downshift with a negative discrete jump J$^-$, thus respectively changing the selection S' to the profile C and the selection S" to the profile III. Similarly, once the point 23 is reached on the track 20, the driver DR actuates the second actuation device 14 again and carries out a second downshift with a negative discrete jump J$^-$, thus respectively changing the selection S' to the profile D and the selection S" to the profile II (thus further increasing the resistance provided by the motor brake of the powertrain system 4 under braking), thus negotiating the curve in these boost PC and release RC configurations.

Once past the chord point of the curve 21, when exiting the same, the driver DR operates the first actuation device 13 at the point 24 and keeps it operated until the point 25 for a time exceeding the minimum actuation time, thus bringing about a continuous increase Jc of both the selection S' and the selection S". This way, the gear increase and thus the torque variation to be delivered occurs continuously up to an intermediate acceleration profile between the profiles B and C and an intermediate deceleration profile between the profiles III and IV.

In this particular example, the first selection S' and the second selection S" are subject to mutual constraints. In other non-limiting examples not illustrated, the first selection S' and the second selection S" are mutually independent.

Advantageously but not necessarily, the vehicle comprises an activation system of the method described in the foregoing, which allows the driver to drive alternatively by selecting either a driving mode with multiple virtual gears (with a customised torque delivery) or a driving mode with a single gear in which the drive torque delivery is delegated to an electronic control system (as in electric cars of a known type).

In use, consequently, the driver DR shifts the virtual gears 8 and 9 as desired, thus changing at will the longitudinal acceleration Ax limit profiles A, B, C, D, I, II, III, IV relative to the longitudinal velocity Vx and thereby varying the percentage of torque delivered to the drive wheels 2 by the powertrain system 4. In particular, the gear-shifting is carried out via the interface system 7, for example the paddles 16 and 17.

Although the invention described in the foregoing makes particular reference to a very precise example embodiment, it is not to be considered limited to this example embodiment, all variants, modifications or simplifications covered by the appended claims falling within its scope, such as, for example, a different type of electric drive, a different type of interface system 7, a different number of virtual gears, etc.

The apparatuses, the car and the method described above have numerous advantages.

First of all, the present invention allows the driver to personally regulate the torque delivered by the electric powertrain system in order to obtain a driving mode that is more engaging and that better matches the feeling sought by the driver in a given instant or for a given curve. This also makes it possible to engage the driver to a greater degree, by attaining anticipated or delayed longitudinal and lateral dynamic behaviours compared to the potential operation of an automatic electronic control system.

Similarly, the present invention makes it possible to regulate, potentially independently and thus in a more customised manner, the deceleration (or anti-motive force), i.e. the level of regeneration provided by the motor brake. In other words, the limitations resulting from the mechanical constraints of cars equipped with an internal combustion engine system are eliminated.

A further advantage of the present invention lies in an increased driving pleasure, precisely by virtue of the fact that the driving experience appears to be more customisable and that the spurt provided by the gear shift is replicated.

In addition, the present invention makes it possible to avoid the use of a traction control, thus leaving the management of excessive torque to the discretion of the driver, who can always shift up or down to manage it, so that performance is not entirely delegated to an electronic control system.

Finally, the control method described above is simple and inexpensive to implement in a road vehicle 1, inasmuch as it does not require the addition of any physical components and is completely implementable via software while exploiting the architectures already normally present on board the road vehicle 1. It is important to note that the method described in the foregoing does not require a large computing capacity or a significant amount of memory and can thus be implemented in a known control unit without the need for upgrades or development.

LIST OF REFERENCE NUMBERS IN THE FIGURES 1 vehicle
2 wheels
3 passenger compartment
4 electric powertrain system
5 electric motor
6 vehicle dashboard
7 interface system
8 first virtual gears
9 second virtual gears
10 accelerator pedal
11 brake pedal
12 control unit
13 first actuation device
14 second actuation device
15 steering wheel
16 right paddle
17 left paddle
18 control assembly
20 track
21 curve
22 downshifting point
23 downshifting point
24 start of upshifting section
25 end of upshifting section
A first limit profile
$A_X$ longitudinal acceleration
$A_{XM}^-$ maximum deceleration
$A_{XM}^+$ maximum acceleration
B first limit profile (A, B, C, D)
C first limit profile (A, B, C, D)
D first limit profile (A, B, C, D)
DS distance
DR driver
FP' inflection point PC
FP" inflection point RC
I second limit profile (I, II, III, IV)
II second limit profile (I, II, III, IV)
III second limit profile (I, II, III, IV)
IV second limit profile (I, II, III, IV)
J⁻ discrete negative jump
J⁺ discrete positive jump
$J_C$ continuous jump
PC boost configuration
PG passenger
RC release configuration
S' first selection (S')
S" second selection (S")
$V_X$ longitudinal velocity
W central steering axis (W)

The invention claimed is:

1. Control method for an electrically driven road vehicle (1) driven by a driver (DR) and comprising an electric powertrain system (4) configured to deliver drive torque to at least two wheels (2) of the road vehicle (1); the method comprises the steps of:

determining a plurality of first virtual gears (8) for a boost configuration (PC);
wherein the first virtual gears (8) each determine a first, acceleration ($A_X$) limit profile (A, B, C, D) as the velocity ($V_X$) varies in the boost configuration (PC);
detecting, following the actuation of an interface system (7) by the driver (DR) while driving, a first selection (S') for one of the first virtual gears (8);
delivering, in the boost configuration (PC), a drive torque to the at least two wheels (2) as a function of the first selection (S');
determining a plurality of second virtual gears (9) for a release configuration (RC); wherein the second virtual gears (9) each determine a second, deceleration (−$A_X$) limit profile (I, II, III, IV) as the velocity varies in the release configuration (RC);
detecting, following the actuation of an interface system (7) by the driver (DR) while driving, a second selection (S") for one of the second virtual gears (9); and
delivering, in the release configuration (RC), an anti-motive torque to the at least two wheels (2) as a function of the second selection (S"),
wherein each of the first and second limit profiles is empirically determined and defines, for each value of vehicle velocity (VX), a maximum allowable acceleration or deceleration, respectively, and wherein the interface system (7) is configured to allow the driver (DR) to continuously select, via a prolonged actuation, any intermediate first or second virtual gear (8, 9) between the empirically determined limit profiles, such that the selected profile is not limited to discrete steps and is any value within a continuous range, and wherein the first selection (S') and the second selection (S") are independently selectable by the driver (DR).

2. Method according to claim 1, wherein the first selection (S') and the second selection (S") are mutually independent.

3. Method according to claim 1, wherein the step of detecting the first selection (S') comprises detecting actuation of the interface system (7) by the driver (DR) when the vehicle (1) is exiting a curve; and wherein the step of detecting the second selection (S") comprises detecting actuation of the interface system (7) by the driver (DR) when the vehicle (1) is approaching a curve.

4. Method according to claim 1, wherein, during the step of detecting, the interface system (7) sequentially detects several variations of the first selection (S') and/or the second selection (S").

5. Method according to claim 1, wherein a variation of the drive or anti-motive torque delivered occurs in response to the variation of the first selection (S') or the second selection (S").

6. Method according to claim 1, wherein each second limit profile (I, II, III, IV) determines an increasing trend of the deceleration (−$A_X$) limit as the velocity ($V_X$) increases in the release configuration (RC), until reaching the maximum deceleration ($A_{XM}^-$) for the powertrain system (4).

7. Method according to claim 1, wherein each first limit profile (A, B, C, D) determines an increasing trend of the acceleration ($A_X$) limit as the velocity ($V_X$) increases in the boost configuration (PC), until reaching the maximum acceleration ($A_{XM}^+$) for the powertrain system (4).

8. Method according to claim 1, wherein the shifting from first gear (8) to another one and/or, from one second gear (9) to another one occurs continuously as a result of a prolonged actuation of the interface system (7) by the driver (DR); wherein the first selection (S') and/or the second selection (S") will be equal to the first gear (8) and/or the second gear (9) reached at the time of the interruption of the actuation.

9. Method according to claim 8, wherein the minimum actuation time is equal to or greater than 400 ms.

10. Method according to claim 1, wherein the first selection (S') and/or the second selection (S") are reset upon the occurrence of a first event and/or a second event, respectively.

11. Method according to claim 10, wherein the first event is approaching a curve; and/or wherein the second event is exiting the curve.

12. Method according to claim 1, wherein, in the case of depression of an accelerator pedal by the driver (DR), the drive and/or anti-motive torque delivered is an interpolation between the current first limit profile (A, B, C, D) and the current second limit profile (I, II, III, IV) as a function of the road vehicle (1) velocity (Vx).

13. Road vehicle (1) comprising:
   four wheels (2), of which at least two wheels (2) are driven;
   an electric powertrain system (4) configured to deliver drive torque to the at least two drive wheels (2);
      an interface system (7) configured to allow the driver (DR) to select a plurality of first virtual gears (8) for a boost configuration (PC), i.e., acceleration ($A_X$);
   wherein the first virtual gears (8) each determine a first, acceleration ($A_X$) limit profile (A, B, C, D) as the velocity ($V_X$) varies in the boost configuration (PC); and
      a control unit (12), configured to detect, following actuation of the interface system (7) by the driver (DR), while driving, a first selection (S') for one of the first virtual gears (8); and to control the delivery of drive torque to the at least two drive wheels (2) as a function of the first selection (S'),
   wherein the interface system (7) is configured to allow the driver (DR) to select a plurality of second virtual gears (9) for a release configuration (RC), i.e., deceleration ($-A_X$);

wherein the second virtual gears (9) each determine a second, deceleration ($-A_X$) limit profile (I, II, III, IV) as the velocity (Vx) varies in the release configuration (RC); and wherein the control unit (12) is configured to detect, following actuation of the interface system (7) by the driver (DR), while driving, a second selection (S") for one of the second virtual gears (9); and to control the delivery of drive torque to the at least two drive wheels (2) according to the second selection (S"), wherein each first acceleration (AX) limit profile and each second deceleration (–AX) limit profile is empirically determined and defines, for each value of vehicle velocity (Vx), a maximum allowable acceleration or deceleration, respectively;

wherein the interface system (7) is further configured to allow the driver (DR) to continuously select, via a prolonged actuation, any intermediate first or second virtual gear (8, 9) between the empirically determined limit profiles, such that the selected profile is not limited to discrete steps but may be any value within a continuous range; and wherein the first selection (S') and the second selection (S") are independently selectable by the driver (DR).

14. Vehicle (1) according to claim 13, wherein the interface system (7) comprises at least one first actuation device (13) operable by the right hand of the driver (DR) and at least one second actuation device (14) operable by the left hand of the driver (DR);
   wherein one between the first actuation device (13) and the second actuation device (14) is configured to allow the driver (DR) to select one of the first virtual gears (8) and the other between the first actuation device (13) and the second actuation device (14) is configured to allow the driver (DR) to select one of the second virtual gears (9).

15. Vehicle (1) according to claim 14, further comprising a steering wheel (15), which is rotatable about a central steering axis (W),
   wherein the first actuation device (13) and the second actuation device (14) are arranged respectively to the right and to the left of said central steering axis (W) to face each other and extend radially from said central steering axis (W).

16. Vehicle (1) according to claim 14, wherein the first actuation device (13) and the second actuation device (14) each comprise two sub-devices, which are configured to allow the driver (DR) to upshift or downshift the first virtual gears (8) and the second virtual gears (9), respectively.

* * * * *